May 16, 1961 R. H. ANDRESEN ET AL 2,984,506
BOOT SEAL
Filed July 2, 1957 2 Sheets-Sheet 1
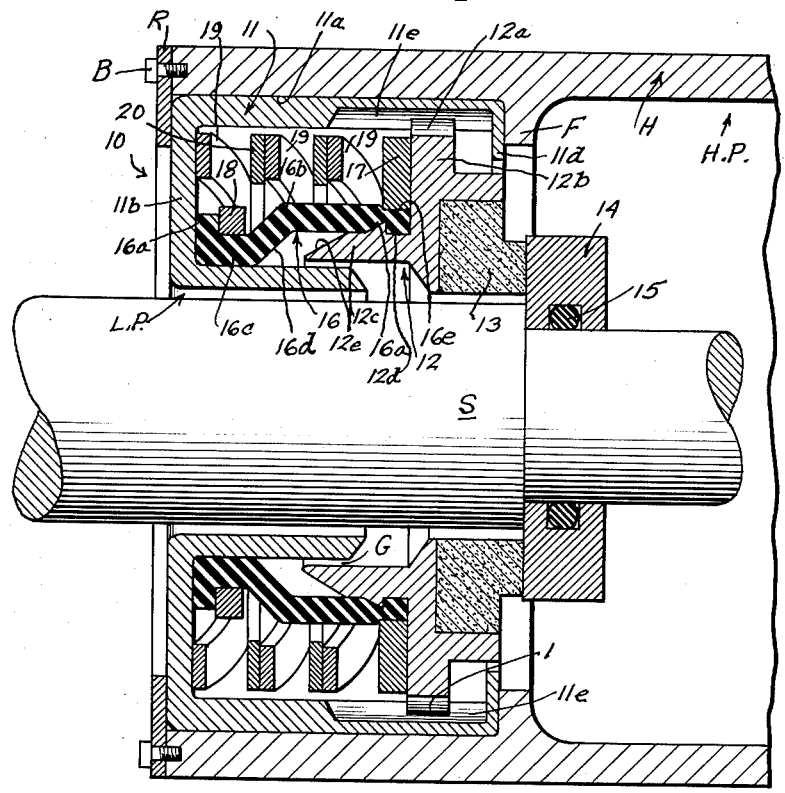
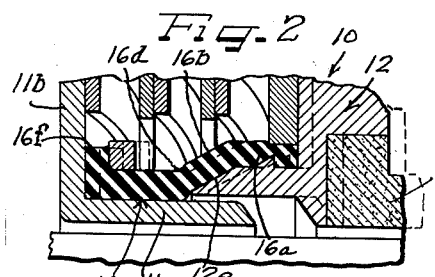
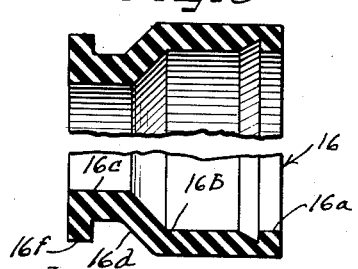
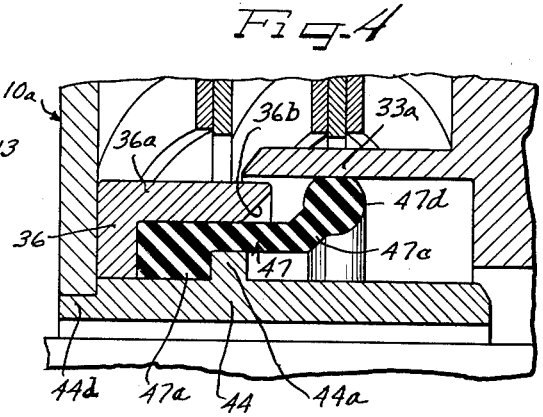
Inventors
RAYMOND H. ANDRESEN
HILMAR A. ANDRESEN
by Hill, Sherman, Meroni, Gross & Simpson Attys.

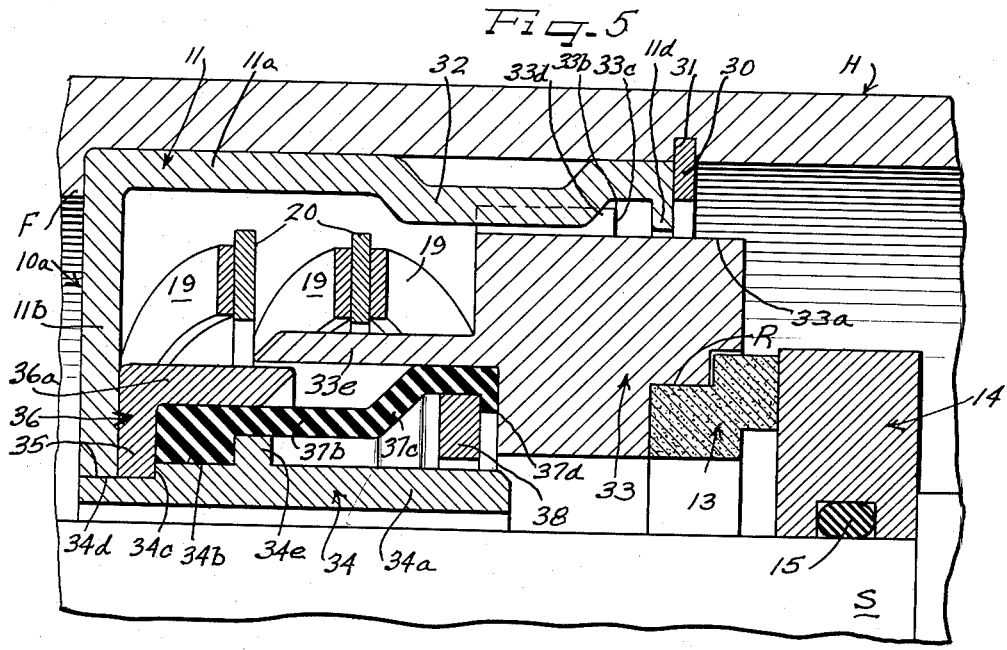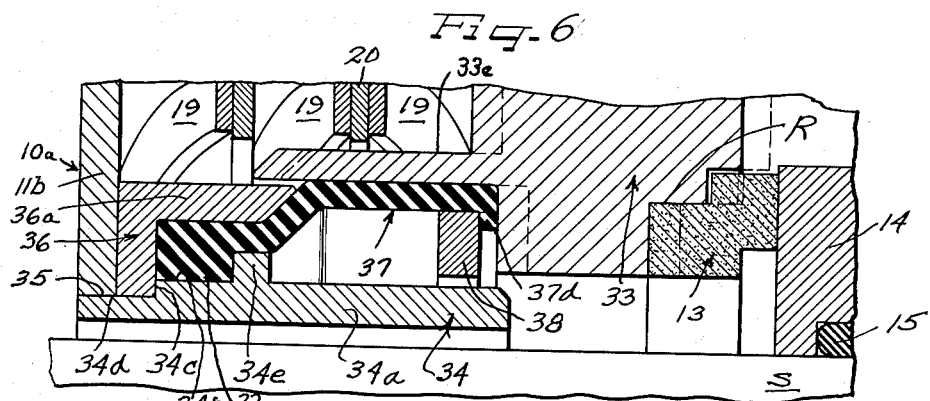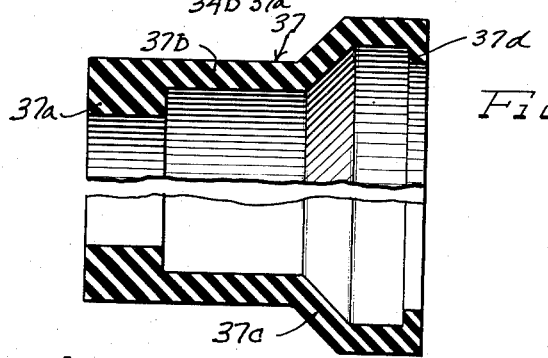

United States Patent Office 2,984,506
Patented May 16, 1961

---

2,984,506

BOOT SEAL

Raymond H. Andresen and Hilmar A. Andresen, both of R.F.D. 4, Box 56, Cuba Road, Barrington, Ill., assignors to Remi J. Gits, Jr., Hinsdale, Edward W. Gits, La Grange, and Mercantile National Bank of Chicago, Chicago, Ill., a national banking association, as co-trustees Filed July 2, 1957, Ser. No. 669,654

3 Claims. (Cl. 286—11)

This invention relates to shaft seals of the axially shifting and relatively rotating face-to-face type wherein one part is telescoped relative to another part and the invention relates especially to the improvement where a pliable boot is sealingly secured at one end to one part and slidably held to the other part while its intermediate portion spans and seals any space between the telescoped parts and is adapted to conform into full conformity with said parts under pressure while the free sliding end accommodates axial shifting of the parts without forming circumferential convolutions.

More particularly, this invention deals with a pliable high pressure boot-equipped shaft seal of the axially shiftable relatively rotating face-to-face seal ring type which can be accurately pressure balanced and is free from hysteresis or lagging in adapting its parts to different positions as demanded by wear and changes in sealing pressure.

Shaft seals of the axially shiftable relatively rotating face-to-face ring type may be divided into two general classes, namely, diaphragm seals and sliding packing type seals. The diaphragm seals quickly change positions to accommodate wear and changes in operating conditions and are thus considered to be free from hysteresis. However, these diaphragm seals must have a relatively large unsupported diaphragm area spanning the gap between the parts being sealed and since one face of this large unsupported area is subjected to pressure while the opposite face is exposed to a low pressure, these seals cannot be accurately pressure-balanced to operate satisfactorily over a range of pressures. Further, such diaphragm seals cannot hold high pressures and are thus only useful in the low pressure field. The sliding packing type seals, on the other hand tend to stick and have a high hysteresis loss or lag in adapting themselves to changed positions for compensating for wear and variations in pressure.

The present invention now provides a seal which combines the freedom of movement of the diaphragm type seal and the pressure-balance control and high pressure capacity of the sliding packing type seal.

According to this invention, a seal ring or seal ring carrier is telescoped on or in a fixed seal part. The two telescoping parts are loosely fitted so that the seal ring will have free axial movement and a limited radial movement. A pliable rubber, plastic, or other fluid impervious material boot spans the gap between the telescoped parts and is sealingly engaged at its opposite ends with the respective parts, but one end is fixed to its part while the other end is slidably carried on its part. The slidably carried portion of the boot accommodates the axial and radial movements of the seal ring and wrinkles and stress forming convolutions are largely avoided. The telescoping parts have support surfaces for the boot and the boot, when subjected to pressure, is pressed against these surfaces into full conformity therewith so that its only unsupported portion is that small area in the gap between the telescoped parts. The boot thus becomes a membrane conforming exactly to the shape of a casing provided by the telescoping seal parts and working with the fluid which it seals. As the seal ring shifts to accommodate wear, new areas of the telescoped parts will be presented to the boot for additional boot support and the free end of the boot will slide along its supporting telescoping surface. Since the telescoped parts have a space therebetween which is free from packing, no frictional contact between the parts will occur and light spring loads are effective to maintain the seal ring in sealing engagement with its relatively rotating part.

A problem which has been encountered in seals of the above-described type has occurred with high pressure differentials wherein the seal has accidentally become damaged. This is encountered when a circumferential convolution is formed in the boot seal as the pressure is being applied. The convolution, of course, forms a surface or wall which extends radially with respect to the axis of the boot and pressures against these radial walls cause axial stresses and tensions on the boot. These axial stresses have become so severe that the boot is torn or damaged or pulled from its connections at the ends.

The present invention contemplates obviating the difficulties encountered from the formation of these circumferential convolutions which create wrinkles and stresses in the boot, create axial stresses due to pressures in an axial direction, and which present forces on the parts to which the ends of the boot is anchored. According to this invention, the boot is secured at one end to anchor the boot in position and extends freely at the other end over the other telescoping part in slidable engagement therewith. The free end of the boot is held firmly but slidably to the other telescoping member by the pressure differential and slides along the support surface with relative movements between the two telescoping parts. This prevents the formations of circumferential convolutions and prevents stresses which might otherwise occur.

An object of this invention, therefore, is the provision of a shaft seal utilizing telescoping parts with a sealing boot wherein one end of the boot is attached and the other end of the boot is free for slidable engagement with the other telescoping part.

A further object of the invention is the provision of a boot-type seal of the type described wherein the danger of the formation of convolutions in the boot material in a circumferential direction is obviated and the possibility of damage to the seal from axial pressure stresses is reduced.

Another object of the invention is to provide a boot seal wherein the axial forces on the telescoping parts which hinder movement of the parts is reduced.

Another object of the invention is to provide a boot seal fitting over telescoping parts wherein at least one end of the boot is unattached, and the boot is spaced adjacent the unattached end from the telescoping part so that the boot can move laterally and axially into position whereby the chance of damaging stresses being created is reduced.

A feature of the invention is the elimination of hysteresis in high pressure balanced seals by avoiding packing and the like restrictions which interfere with free movement of the seal ring.

Another important feature of the invention is to provide a seal which will not tend to open up a leakage path between the seal ring and its carrier when subjected to high internal pressures.

Another feature of the invention is the provision of a seal which will not stick even when its pliable boot is exposed to fluid which softens or swells the boot material.

It is then an important object of this invention to provide a seal free from hysteresis and capable of maintaining an accurate pressure balance even when exposed to high pressure.

Another object of this invention is to provide a shaft seal of the relatively rotating ring type wherein one of the rings is always adapted to shift to accommodate wear and changes in operating conditions while retaining pressures not capable of being held by diaphragm seals.

Another object of this invention is to provide a seal with high pressure boot which will accommodate free axial shifting and limited radial displacement of a seal ring.

A still further object of this invention is to provide a seal with a high pressure boot that, in effect, becomes part of the sealed fluid and works with this fluid under pressure to avoid any restrictions in desired movement of the seal ring.

Another object of the invention is to provide a boot-type seal having the boot exposed to pressure and having boot supporting surfaces providing a boot casing which is expansible and contractible to accommodate axial and limited radial movements.

Other and further features and objects of this invention will be apparent to those skilled in this art from the following detailed description of the annexed sheets of drawings which, by way of preferred examples only, illustrate several embodiments of the invention.

On the drawings:

Figure 1 is an axial cross-sectional view of one form of seal according to this invention mounted in a housing so as to be exposed to external pressure.

Figure 2 is a fragmentary cross-sectional view of Figure 1 showing the position of the boot when subjected to external pressure.

Figure 3 is an axial cross-sectional view of the boot for the seal of Figures 1 and 2 showing the free state molded shape of the boot.

Figure 4 is an axial cross-sectional view of an alternate form of the boot of Figures 5 through 7.

Figure 5 is a fragmentary axial cross-sectional view of another form of seal according to this invention especially adapted to internal pressures and showing the seal mounted in a housing for receiving such pressures.

Figure 6 is a view similar to Figure 5, but showing the position of the boot when subjected to internal pressures.

Figure 7 is a view similar to Figure 3, but showing the free state molded shape of the boot in the seal of Figures 5 and 6.

As shown in the drawings:

The seal 10 of Figures 1 to 3, is illustrated as mounted in a housing H equipped with a shaft S and having a high pressure zone H.P. to be sealed from a low pressure zone L.P. The seal 10 is thus externally exposed to the high pressure zone.

The seal 10 includes a metal casing 11 pressed into the housing H against an internal housing flange F and held in the housing by a ring flange R detachably connected to the housing as by means of studs, screws or bolts B.

The casing 11 has a main cylindrical side wall 11a which snugly fits in the housing H and has an end wall or front wall 11b in the right angular relation thereto spanning the gap between the housing and an integral tubular sleeve portion 11c which loosely embraces the shaft S. This tubular portion 11c projects inwardly from the wall 11b to terminate inside of the casing. The opposite end of the casing has a spun-in flange 11d bottomed on the housing flange F but terminating radially outward from the tube 11c. Therefore, the wall 11b is of considerably greater radial depth than the flange 11d.

The side wall 11a is provided with a plurality of circumferentially spaced internal grooves 11e extending inwardly from the flange lid.

A metal carbon seal ring carrier ring 12 is fitted freely in the casing 11 and has rib or lugs 12a freely slidable in the grooves 11e to hold the ring against rotation in the casing while accommodating free axial shifting of the ring.

The ribs 12a are on a radial flange portion 12b of the ring 12 which fits loosely in the side wall 11a of the housing but is of greater diameter than the opening provided by the housing end flange 11d so as to retain the carrier 12 in the housing. The carrier 12 has a recess receiving a carbon sealing ring 13 which has a nose portion projecting beyond the casing flange 11d into face-to-face sealing engagement with a rotating metal seal ring 14 secured on the shaft S. A rubber seal ring 15 is mounted in an internal groove in the seal ring 14 to sealingly engage the shaft S to prevent leakage between the shaft and ring 14. As shown, the ring 14 is bottomed against a shoulder of the shaft and is press-fit sufficiently right to the shaft so as to be fixed thereto for co-rotation therewith.

The carrier ring 12 has a tubular projection 12c radially inward from the flange 12b thereof and overlying the tubular portion 11c of the casing in spaced concentric relation therewith. This tubular projection 12c has an external groove 12d at its root end. A pliable rubber, plastic, or other fluid impervious material boot 16 surrounds the tubes 11c and 12c of the casing and carrier ring, respectively, and has one end thereof sealingly seated in the groove 12d and the other end thereof bottomed against the casing wall 11b.

A metal clamping ring 17 bottomed on the carrier ring 12, surrounds one end of the boot 16 to secure this end in the groove 12d. A ring 18 surrounds the other end of the boot 16 and is bottomed against an external end flange 16f of the boot. This ring, however, merely lends stiffness to the end of the boot and does not hold it tightly against the tube 11c, but permits the end of the boot to slide on this tube. A stack of wave washer springs 19 with interposed flat washers 20, surround the boot 16 with one end bottomed on the casing wall 11b and the other end urged against the clamping ring 17.

The spring stack urges the carbon seal ring 13 against the side face of the rotating seal ring 14 and can be modified so as to provide any desired sealing load against the rotating seal ring.

The telescoped tubular portions 11c and 12c have cylindrical support surfaces on which the boot 16 can rest. The sleeve 16 is shown in its free state in Figure 1. The end 16a is anchored to the telescoping portion 12c and projects out beyond the tapered end 12e of the telescoping portion at the intermediate portion 16d of the boot. From the intermediate portion the boot tapers down to the end 16c, which is snugly but slidably held against the telescoping portion 11c. The tapered portion of the boot is shown at 16d in the detail of Figure 3. For anchoring the end 16a of the boot, an inwardly turned bead 16e fits into a groove 12d in telescoping portion 12c and is held therein by a ring 17.

When the seal 10 is in its free or unloaded state, the flange 12b of the carrier ring 12 is bottomed against the casing flange 11d and the boot is in approximately its free state position as shown in Figure 3 and also as shown in Figure 1. However, when the seal 10 is pressed into the housing H so that the carbon ring 13 is bottomed against the rotating shaft ring 14, the carrier ring flange 12b is depressed into the housing away from the flange 11d thereby loading the spring stack and causing the free end 16c of the boot to slide along the tubular portion 11c. Thus, the boot lengths remain the same and no axial resistance to such sliding movement is caused. The free end of the tubular portion 12c which overlaps the tube 11c has an external tapered face 12e underlying the intermediate portion 16b of the boot and adapted to receive the boot, as shown in Figure 2, when the boot is externally pressure loaded.

It will be noted that the telescoped tubes 11c and 12c have a relatively narrow gap G therebetween in the operating position of the seal 10. This gap will accommodate limited relative radial displacement of the seal ring carrier 12 and casing 11 and it will be noted from Figure 2 that the grooves 11e in the casing are deeper than the ribs or lugs 12a of the ring 12 so as not to interfere with this permissible limited radial displacement.

The gap G also accommodates free relative axial movement between the seal ring carrier 12 and the casing 11.

When the seal is externally exposed to high pressure from the zone H.P. in the housing H, the high pressure will act on the exterior of the boot 16 to bring its circumference into full conformity with the tubes 11c and 12c as shown in Figure 2 with the intermediate boot portion 16b tightly seated against the tube 11c, the intermediate boot portion 16b also tightly seated against the inclined tube end 12e and the end of the boot portion 16 tightly seated against the root of the tube 12c. Thus, the only unsupported portion of the boot 16 is that portion which spans the narrow gap G between the telescoped parts and this gap is sufficiently narrow that the tube cannot appreciably extrude into the gap to form a locking wedge interfering with free relative radial and axial movements of the tubes.

The free unsupported intermediate portion 16b of the boot provides extra material which aids in preventing stresses on the boot material when the pressure is first applied to cause the boot to conform to the conformation of the tubular portions 11c and 12c. In moving to a conforming position, the free sliding end 16c of the tube will move axially, if necessary, as is shown in Figure 2, permitting the relief of any axial stresses or strains that are set up in the boot. The pressure, of course, will force the end of the boot snugly against the tube 11c preventing the leakage of any pressure. The small, in amount, of natural stiffness possessed by the boot 16 and the friction between the face of the boot and the tube portion 11c will prevent the free end 16c of the boot from creeping back to expose the gap between the tubular portions.

It will be seen from the drawings that as the carbon ring 13 wears, the tubular portion 12c will follow to the right until the surface 12e approaches the position shown by the dotted line surface 12e. During this wear, the free end 12c of the boot will follow sliding along the outer surface of the tubular portion 11c. Since there are no circumferential wrinkles or convolutions in the boot 12c there need be no change in its configuration, and thus no strains or cracks are formed. In some instances, due to the pressure against the outer surface of the boot, it may become adhered to the tube 11c, but stretching will occur axially along the boot and since there are not convolutions, there will be no points of concentration of stress and the boot will stretch until the adhered portion is pulled loose.

Thus, the high pressure zone H.P. is effectively sealed from the low pressure zone L.P. and the boot is fully supported on rigid surfaces so that it cannot burst. The boot, in effect, becomes part of the high pressure working fluid to assist the spring stack in urging the seal ring 13 against the rotating ring 14 thereby increasing the sealing load as pressures are increased.

Since the gap G insures free relative movements of the casing and seal ring parts, the spring stack need only exert a relatively light load to maintain the carbon ring 13 in proper sealing engagement against the rotating ring 14. If eccentricities should develop during the operation or if the parts should be initially misaligned, this misalignment is accommodated by the gap G which permits limited radial displacement of the parts.

In the modified seal 10a of Figures 5 and 6, parts corresponding with the above described parts in connection with the seal 10 of Figures 1 to 3 have been generally identified by the same reference numerals while the modified portions of these parts are hereinafter more fully explained.

In Figure 5, the seal assembly 10a is illustrated as mounted in a housing H and around a shaft S wherein the high pressure zone H.P. of the housing communicates with the interior of the seal assembly along the shaft S and is sealed from the low pressure L.P. which communicates with the exterior of the seal assembly. This is a reversal of the venting of the seal parts from that shown in Figures 1 to 3 and the seal 10a is, therefore, referred to as an internal seal as contrasted with the external seal 10.

The seal casing 11 is pressed into the housing against the abutment flange F and is retained in position by a snap-ring 30 projecting from a groove 31 in the housing to abut the inturned flange 11d of the casing.

Instead of being internally grooved to provide means for locking the carbon ring carrier ring against rotation, the casing 11 of the seal 10a has a series of circumferentially spaced internal axially extending ribs 32 which are formed by indenting the side wall 11a of the casing near the flange 11d. These ribs can be spaced the same as the grooves 11e as shown in Figure 2.

The carrier ring 33 for the carbon ring 13 has a cylindrical peripheral wall 33a of a diameter to fit freely within the opening provided by the casing flange 11d. This diameter is increased to provide a larger diameter cylindrical periphery 33b which is greater than the opening provided by the flange 11d but less than the interior bore of the casing wall 11a. A shoulder 33c is thus provided which will abut the flange 11d to retain the carrier within the casing.

The large diameter portion 33b of the carrier ring is castellated or axially grooved at intervals to mate with the ribs 32 thereby providing grooves 33d receiving the ribs and accommodating axial shifting of the carrier ring while retaining it against rotation in the casing.

The carrier ring 33 has a recess in its front face receiving the carbon ring 13 and a tubular portion 33e projecting from its back face into the casing.

A tube or sleeve 34 corresponding with the integral tubular projection 11c of the casing 11 of Figures 1 to 3, is press-fitted into the opening of the end wall 11b of the casing of Figures 5 and 6. This tube or sleeve 34 has a large internal diameter to loosely embrace the shaft S and provide a gap between the shaft and tube.

The tube has a cylindrical external wall 34a extending outwardly from a holding ridge 34e and an inner cylindrical wall 34b. This wall 34b terminates at a radial shoulder 34c and a reduced diameter end wall portion 34d continues from the shoulder 34c to the end of the tube to be press-fitted into the circular opening 35 provided by the casing wall 11b.

A combined clamping ring and tube or sleeve 36 has an end wall clamped against the casing wall 11b by the shoulder 34c of the tube 34 and has a tubular rim 36a overlying the tube 34 in concentric relation.

A pliable boot or sleeve 37 corresponding with the boot 16 of the seal of Figures 1 to 3, surrounds the tube 34 and lies inside of the tubular projection 33e and the tubular projection 36a. This boot is composed of flexible impervious material such as rubber, plastic, or the like, and in its molded free state, as shown in Figure 7, has an inturned bead or rib 37a at one end thereof, an elongated cylindrical portion 37b providing the main side wall, an outwardly flared portion 37c, and an internally projecting bead or rib 37d at the opposite end thereof. The end of the boot carrying rib 37a snugly embraces the cylindrical wall 34b of the tube 34 and the clamping ring 36 embraces the ribbed end to maintain a sealed engagement with the tube. The rib is thus held behind the holding flange 34e. The opposite end of the boot carrying the bead 37d is slidably related to the inner surface of the tube 33e. The boot end is held in snug sliding engagement with the tube 33e by the ring 38 which fits just inside the bead 37d.

With the end carrying the bead 37a being fixed, and the other end carrying the bead 37d being slidably free, the boot can remain axially straight when the carbon ring is moved and pressed against its cooperating rotating ring 14 so as to compress the spring stack 19 to carry the ring shoulder 33c forwardly from the flange 11c. With wear in the carbon ring 13, the parts will have relative movement to the dotted line position shown in Fig. 6. Thus relative movement of parts is accommodated without the necessity of forming stress creating convolutions.

As shown in Figure 6, when the interior of the seal assembly 10a is exposed to pressure, the boot 37 will be forced outwardly and conformed to lie against the internal wall of the tubular projection 33e of the carrier ring 33 and the tubular projection 36a of the clamping ring 36. Thus the boot is fully supported except for that small area which spans a narrow gap G between telescoped tubular projection 33e and the tubular projection 36a. Since the mid portion 37b of the boot projects beyond the end of the tubular projection 36a, there is free material to be pressed outwardly to conform to the tubular projection 33e. This free material tends to prevent stretching and prevents the creation of stresses. Also, the free material pressed inwardly is accommodated by the free sliding end 37d of the boot and the formation of the convolutions or ridges in a circumferential direction prevented. As was previously stated, these radial convolutions are avoided by the present invention and, therefore, the axial stresses caused by the pressure on the inside of the boot are avoided.

In the view shown in Figure 4, the boot 47 functions similarly to the boot of Figures 5, 6 and 7. The construction of the sealing elements are similar to that of Figure 5 and are, therefore, numbered similarly. It, therefore, is not necessary to go into the full description of the relative parts. The tubular boot 47 is formed of a rubber or the like impervious material, similar to the boot 37 and contains an inwardly projecting rib 47a, which holds the secured end of the boot in place. The rib is held in place by an outwardly extending flange 44a on the tubular member 44, which is similar to the element 34 of Figure 5, and which performs a similar function, being only slightly different in shape. The intermediate portion 47b of the boot projects beyond the end of the tubular portion 36a, which is tapered at 36b to provide a smooth surface for the boot when it is pressed upwardly against the tubular section 33a with increasing internal pressure to cause a pressure across the gap G. The free end 47c of the boot carries an annular enlarged bead 47d which is circular in cross section. This bead may be formed of rubber or the same material as the boot and provides a bearing or pressure member for the free end 47c of the boot which slides along the inner surface of the tubular member 33e. When a pressure differential occurs due to an increase in pressure on the inside of the sealing member, the central portion 47b of the boot will be forced outwardly to conform to the tubular portions 36a and 33e, and the annular bead 47d will roll its rounded edge and slide forwardly to permit easy conformation of the boot to its mating supporting surfaces.

It will thus be seen that we have provided an improved combined internal-external shaft seal which meets the objectives and advantages hereinbefore set forth. The improved boot which forms the seal is secured at one end and slidably mounted on the tubular portion at the other end so that positional variations between the telescoping tubular portions will not place stresses on the boot, nor cause radial ridges which present a surface against which the pressure can act.

We have, in the drawings and specification, presented a detailed disclosure of the preferred embodiments of our invention, but it is to be understood that we do not intend to limit the invention to the specific form disclosed, but intend to cover all modifications, changes and alternative constructions and methods falling within the scope of the principles taught by our invention.

We claim as our invention:

1. A seal comprising a seal ring having a face adapted to ride in mated sealing relation relative to an opposed member, a casing for said seal ring, means between the casing and seal ring urging the seal ring in a direction to hold said seal ring face and said opposed member in sealing relationship, said casing and said seal ring each having tubular portions in telescoping relation with said tubular portions having cylindrical surfaces facing in the same radial direction, a fluid impervious pliable axially extending elongated tubular boot spanning said tubular portions and supported on said cylindrical surfaces along its entire length, said cylindrical surfaces forming a continuous unitary support surface for the boot, and means securing one of the ends of the boot to the tubular portion on which it is supported, the other end of the boot being free of axially restraining attachment to the cylindrical surface on which it is supported to freely slide axially on its supporting cylindrical surface.

2. A seal comprising a seal ring having a face adapted to ride in mated sealing relation relative to an opposed member, a casing for said seal ring, means between the casing and seal ring urging the seal ring in a direction to hold said seal ring face and said opposed member in sealing relationship, said casing and said seal ring each having tubular portions in telescoping relation with said tubular portions having cylindrical surfaces facing in the same radial direction, a fluid impervious pliable axially extending elongated tubular boot spanning said tubular portions and supported on said cylindrical surfaces along its entire length, said cylindrical surfaces forming a continuous unitary support surface for the boot, an inclined face at the end of the outermost of said cylindrical surfaces with respect to the boot facing the boot and tapering inwardly toward the other cylindrical surface for providing a smooth transition support ramp between said surfaces, and means securing one of the ends of the boot to the tubular portion on which it is supported, the other end of the boot being free of axially restraining attachment to the cylindrical surface on which it is supported to freely slide axially on its supporting cylindrical surface.

3. A seal in accordance with claim 1 in which said cylindrical surfaces both face radially outwardly.

References Cited in the file of this patent

UNITED STATES PATENTS

| | | |
|---|---|---|
| 2,432,694 | Snyder | Dec. 16, 1947 |
| 2,474,123 | Schmitz | June 21, 1949 |
| 2,479,968 | Schick | Aug. 23, 1949 |
| 2,593,899 | Krug | Apr. 22, 1952 |
| 2,750,215 | Bermingham | June 12, 1956 |
| 2,753,198 | Ayling | July 3, 1956 |
| 2,784,017 | Bermingham | Mar. 5, 1957 |
| 2,899,219 | Payne | Aug. 11, 1959 |